United States Patent
Luo

(10) Patent No.: US 8,914,045 B2
(45) Date of Patent: Dec. 16, 2014

(54) METHOD FOR FEEDING BACK LOCATION AND WEATHER INFORMATION BY A MOBILE COMMUNICATION TERMINAL AND MOBILE COMMUNICATION TERMINAL

(75) Inventor: Zhiwei Luo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/580,086

(22) PCT Filed: Aug. 18, 2011

(86) PCT No.: PCT/CN2011/078603
§ 371 (c)(1),
(2), (4) Date: Aug. 20, 2012

(87) PCT Pub. No.: WO2012/167506
PCT Pub. Date: Dec. 13, 2012

(65) Prior Publication Data
US 2014/0094191 A1 Apr. 3, 2014

(30) Foreign Application Priority Data

Jun. 8, 2011 (CN) .......................... 2011 1 0152550

(51) Int. Cl.
*H04W 4/02* (2009.01)
*H04W 88/02* (2009.01)

(52) U.S. Cl.
CPC ................ *H04W 4/02* (2013.01); *H04W 88/02* (2013.01); *H04W 4/028* (2013.01)
USPC .................. 455/456.3; 455/456.1; 455/456.2; 455/414.2

(58) Field of Classification Search
CPC ......... H04W 4/02; H04W 4/04; H04W 88/02; G06Q 30/02
USPC .................................. 455/456.1, 456.3, 414.2
See application file for complete search history.

(56) References Cited

U.S. PATENT DOCUMENTS

| 7,912,628 B2* | 3/2011 | Chapman et al. ............. 701/117 |
| 2010/0291948 A1* | 11/2010 | Wu et al. ..................... 455/456.1 |
| 2011/0054776 A1* | 3/2011 | Petrov et al. .................. 701/201 |
| 2011/0128144 A1* | 6/2011 | Baron et al. ............... 340/539.3 |

FOREIGN PATENT DOCUMENTS

| CN | 101827323 | 9/2010 |
| CN | 101895623 | 11/2010 |
| CN | 101945245 | 1/2011 |

\* cited by examiner

*Primary Examiner* — Kashif Siddiqui
*Assistant Examiner* — Farideh Madani
(74) *Attorney, Agent, or Firm* — Brooks Kushman P.C.

(57) ABSTRACT

A method for feeding back location and weather information by a mobile communication terminal is disclosed, including: obtaining location and weather information of a local machine; sending the obtained location and weather information to a feedback terminal which is preset in the local machine and requires for feedback of the location and weather information of the local machine. Both the local machine and the feedback terminal may be mobile communication terminals. Through the method, the location and weather information of the local machine can be fed back to the feedback terminal.

12 Claims, 5 Drawing Sheets

METHOD FOR FEEDING BACK LOCATION AND WEATHER INFORMATION BY A MOBILE COMMUNICATION TERMINAL AND MOBILE COMMUNICATION TERMINAL

CROSS-REFERENCE TO RELATED APPLICATION

This application is the U.S. national phase of PCT Appln. No. PCT/CN2011/078603 filed Aug. 18, 2011 which claims priority to Chinese Application No. 201110152550.1 filed Jun. 8, 2011, the disclosures of which are incorporated in their entirety by reference herein.

TECHNICAL FIELD

The present invention relates to the communication field, and in particular, to a method for feeding back location and weather information by a mobile communication terminal and a mobile communication terminal.

BACKGROUND OF THE RELATED ART

At present, there is only one child in most Chinese families, while the child today has strong independent consciousness, and most of the time the child acts independently by oneself without being kept an eye on by a guardian. In this case, the child might go out and get lost, meet the bad person and be deceived etc. In addition, with the improvement of Chinese economy, a plurality of old people like going out for travelling, while the sons and daughters of these old people are often busy working and unable to accompany them, which will result in the same problem as well. So, for the guardian of these children or old people, it becomes very necessary to be able to know the current location information of the children or old people in time.

Aiming at the above-mentioned problem, there are already a plurality of mobile communication terminals with positioning function (such as the guarding mobile phone) in the market. The GPS function of the mobile communication terminal of the person under guardianship (the local machine) is started by sending one short message from the mobile communication terminal of the guardian (the feedback terminal), and then the obtained positioning information is sent to the mobile communication terminal of the guardian (the feedback terminal). Although it can know the geographical location information of the child or old people constantly by this way, but it neglects a very important factor—weather. Because the children or old people belong to the disadvantaged groups, and the resistance and the adaptive capacity are relatively weaker, and the health is easy to be influenced by the weather. For the child, when the child acts alone, since the guardian is not around, the child is often unable to look after himself, and is apt to get sick such as cold, etc., when the weather changes. And for the old people, the change of the weather is also apt to get the diseases usually got by old people such as hypertension, coronary heart disease, diabetes, etc. So, when the children or old people go out, it is very necessary for their guardians to know their location and the weather state around their location constantly, and to look after and remind them remotely by using the mobile communication means when the weather changes.

CONTENT OF THE INVENTION

The main objective of the present invention is to provide a method for feeding back location and weather information by a mobile communication terminal and a mobile communication terminal, which is aimed at directionally feeding back the location and weather information of the mobile terminal in time.

The present invention provides a method for feeding back location and weather information by a mobile communication terminal, comprising the following steps:

obtaining location and weather information of a local machine;

sending the obtained location and weather information to a feedback terminal preset in the local machine and requiring for feedback of the location and weather information of the local machine; and both the local machine and the feedback terminal being mobile communication terminals.

Preferably, the step of obtaining location and weather information of a local machine specifically comprises:

the local machine, according to a received feedback request, obtaining the number of a mobile communication terminal of an opposite end sending the request;

judging whether the number is the number of the feedback terminal;

if yes, then receiving a GPS satellite signal, and obtaining the location information of the local machine according to the GPS satellite signal; and sending the location information to a mobile operator, and obtaining the weather information of a current location.

Preferably, before receiving a GPS satellite signal and obtaining the location information of the local machine according to the GPS satellite signal, the method further comprises:

when the local machine does not start a GPS function and a weather forecast function, then starting the GPS function and the weather forecast function by force.

Preferably, after performing obtaining the location and weather information of the local machine, the method further comprises:

when the obtained weather information exceeds a preset threshold value, then sending out warning information.

Preferably, if the trigger condition is that the location changes, the step of obtaining the location and weather information of the local machine specifically comprises:

the local machine checking whether the location information changes;

if the location information changes, then sending new location information to the mobile operator, and obtaining the weather information of the new location, Preferably, the threshold value comprises: one or more of a low temperature threshold value, a high temperature threshold value, a strong wind threshold value, a low visibility threshold value and a strong ultraviolet threshold value.

The present invention further provides a mobile communication terminal, comprising:

a setting module, configured to preset a feedback terminal requiring for feedback of location and weather information of the mobile communication terminal;

a calling module, configured to obtain the location and weather information of the mobile communication terminal; and a sending module, configured to send the obtained location and weather information to the feedback terminal preset by the setting module.

Preferably, the calling module is specifically configured to:

according to a received feedback request, obtain the number of a mobile communication terminal of an opposite end which sends the request;

judge whether the number is the number of the feedback terminal;

if yes, then receive a GPS satellite signal, and obtain the location information of the mobile communication terminal according to the GPS satellite signal; and send the location information to a mobile operator, and obtain the weather information of a current location.

Preferably, the calling module is further configured to: when the mobile communication terminal does not start a GPS function and a weather forecast function, start the GPS function and the weather forecast function by force.

Preferably, the mobile communication terminal further comprises:

an alarm module, configured to, when the obtained weather information exceeds a preset threshold value, then send out warning information.

Preferably, the calling module is configured to:

check whether the location information changes;

if the location information changes, then send new location information to the mobile operator, and obtain the weather information of the new location.

Preferably, the threshold value comprises: one or more of a low temperature threshold value, a high temperature threshold value, a strong wind threshold value, a low visibility threshold value and a strong ultraviolet threshold value.

The method for feeding back location and weather information by a mobile communication terminal and a mobile communication terminal described by the present invention, through further feeding back the weather information of the location when feeding back the location information of the mobile communication terminal, which enables, when the child or old people goes out, their guardian know their location and the weather condition of the location constantly, specifically:

1. after the mobile communication receives the feedback request sent by another appointed mobile terminal, it can feed back the current geographical location information and the weather forecast information of the current located region to the appointed mobile terminal;

2. when the geographic location of the mobile terminal changes, or when the weather of the location gets worse, it can notify the appointed mobile terminal voluntarily in time;

3. the mobile terminal can automatically perform the alarm warning according to the weather condition.

PREFERRED EMBODIMENTS OF THE PRESENT INVENTION

In order to make the technical scheme of the present invention more clear and distinct, it will be described in detail by combining the accompanying drawings hereinafter.

It should be understood that the specific embodiments described here are only used to explain the present invention and not used to limit the present invention.

In the present invention, the local machine is a mobile communication terminal which is required to feed back the location and weather information, and the feedback terminal is other appointed mobile communication terminals at the opposite end which receives the location and weather information of the local machine.

Figure 1:
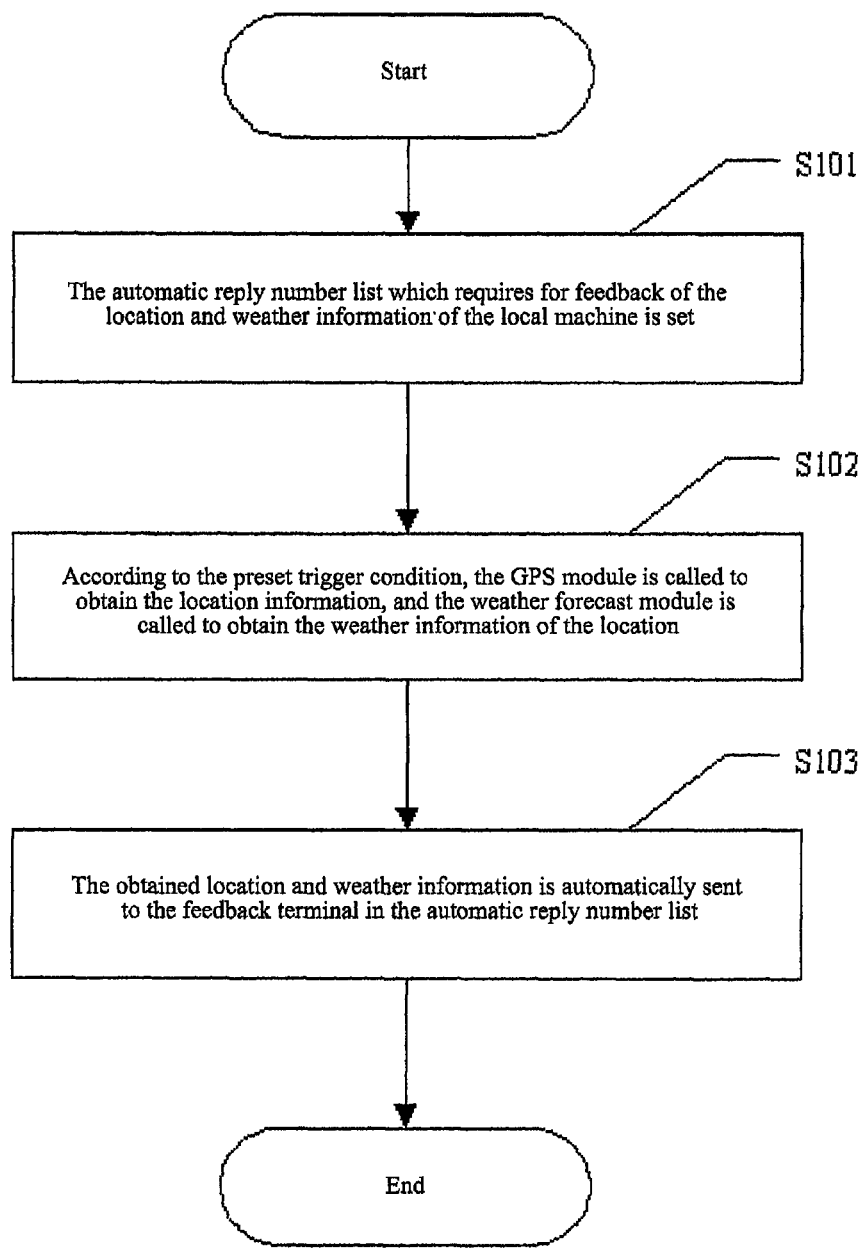
FIG. 1 is a schematic diagram of the flow chart of a method for feeding back location and weather information by a local machine according to an embodiment of the present invention.

As shown in FIG. 1, the present invention provides a method for feeding back location and weather information by a mobile communication terminal, including the following steps:

in S101: set a list of automatic reply numbers required to feed back the location and weather information of the local machine;

after starting the local machine, the automatic reply number which requires for automatically feedback of the location and weather information of the local machine is set in the setting module of the local machine, where the automatic reply number is the number of the feedback terminal, which is stored in the automatic reply number list of the local machine; when the condition is met, the local machine sends the location and weather information to the feedback terminal automatically.

In S102: according to the preset trigger condition, the GPS module is called to obtain the location information, and the weather forecast module is called to obtain the weather information of the location.

The preset trigger condition includes that the feedback terminal corresponding to the number in the automatic reply list sends a feedback request, and when the preset trigger condition is met, the GPS module is called, and the GPS module receives the GPS satellite signal and calculates and obtains the current region location information of the local machine according to the satellite signal. The weather forecast module is called and the weather forecast module converts the obtained region location information into the region marking code, (for example, when it is obtained that the current region location of the local machine is Xi'an City, China, then the location information is converted into the region marking code of Xi'an 086029), and then the weather forecast query code (such as, *#55*086029) is sent to the mobile operation service provider, and the weather information of the region location is obtained.

In S103: the obtained location and weather information is automatically sent to the feedback terminal in the automatic reply number list.

The obtained location and weather information is added to the short message attachment by the figure or text way, and then the short message is sent to the feedback terminal automatically.

Figure 2:
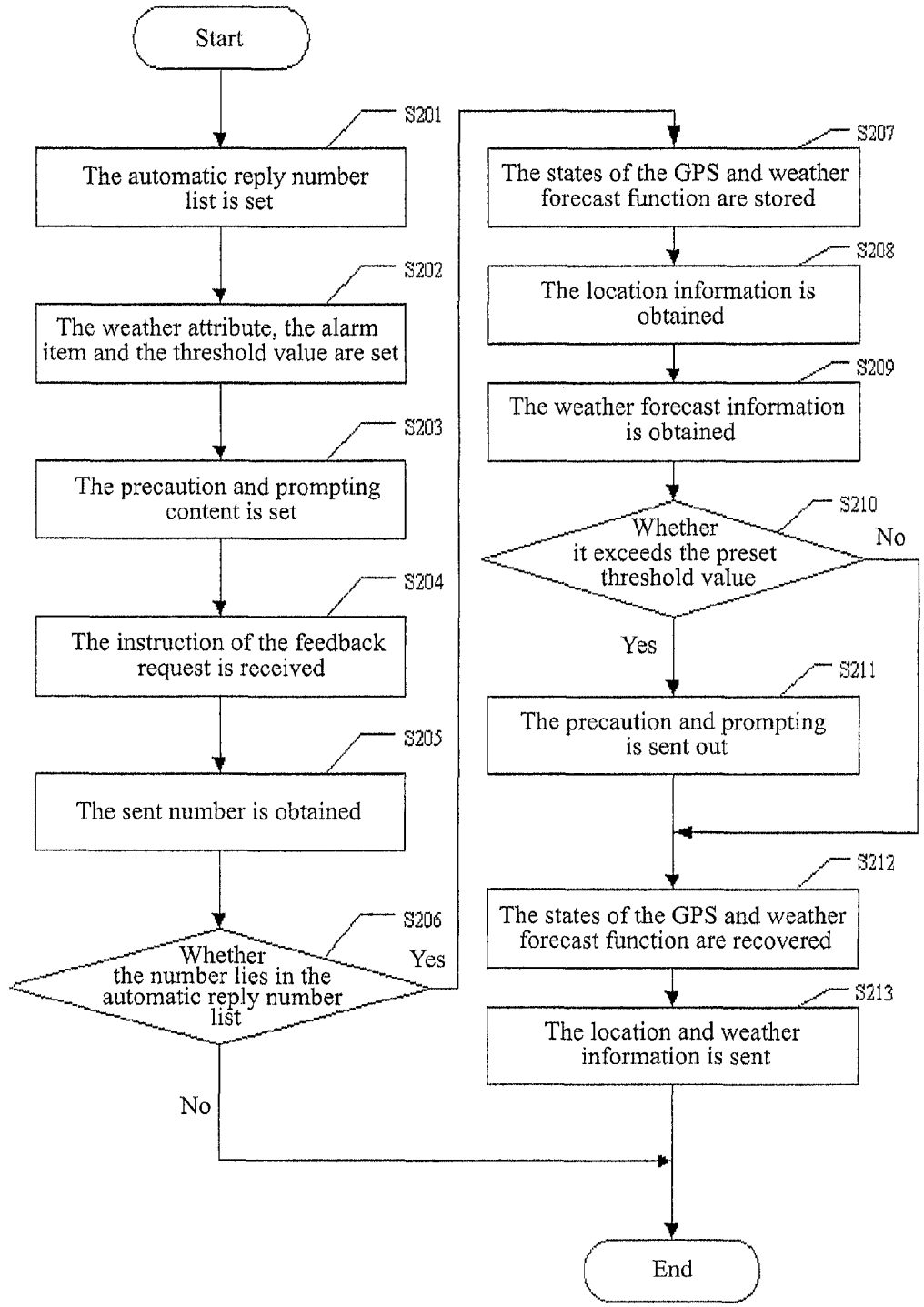
FIG. 2 is a schematic diagram of the flow chart of feeding back location and weather information by a local machine when a feedback terminal sends a feeding back request according to an embodiment of the present invention.

As shown in FIG. 2, it is a specific schematic diagram of the flow chart of a method for feeding back location and weather information by a mobile communication terminal according to an embodiment of the present invention. Now the trigger condition is that the feedback terminal corresponding to the number in the automatic reply list sends a feedback request, including the following steps:

in S201: the automatic reply number list is set.

The local machine is started, and the automatic reply number is input in the setting module of the local machine and stored in the automatic reply number list.

In S202: the weather attribute, the alarm item and the threshold value are set.

For example, the corresponding relation of the weather attribute, the alarm item and the threshold value can be shown in Table 1. When the condition of the alarm item and the threshold value set in the list is met, the local machine will send out the warning information automatically, for example, sending out the warning sound for prompting.

TABLE 1

| Weather attribute | Alarm item | Threshold value |
|---|---|---|
| Temperature | Low temperature | 16 |
| Temperature | High temperature | 30 |
| Weather phenomenon | Rainy | 25 |
| Wind direction and wind force | Strong wind | 7 |
| Air visibility | Low visibility | 100 |
| Ultraviolet rays | Strong ultraviolet rays | 3 |
| ... | ... | ... |

In S203: the precaution and prompting content is set.

Corresponding to the alarm item in Table 1, the precaution and prompting content in the text or voice format is input in the setting module and stored in the list, as shown in Table 2. When the condition of the alarm item and the threshold value set in Table 1 is met, the local machine sends out the warning information, for example, the warning sound is sent out and the corresponding precaution and prompting content preset in this step is sent out automatically.

TABLE 2

| Alarm item | The precaution and prompting content |
|---|---|
| Low temperature | Add clothes, and prevent to catch cold |
| High temperature | Avoid long time sunlight exposure and prevent sunstroke when performing outdoor activities |
| Rainy | Remember to take the umbrella when going out |
| Low visibility | Low visibility, drive in limited speed |
| Ultraviolet rays | Remember to have sun block |
| ... | ... |

In S204: the instruction of the feedback request is received.

The feedback request instruction is a short message or a call sent to the local machine by the feedback terminal for requesting to feed back the location and weather information of the local machine.

In S205: the sent number is obtained.

The number of the feedback terminal which sends the short message is extracted.

In S206: whether the number lies in the automatic reply number list is judged.

By traversing the automatic reply number list set in the step S201, whether the extracted number of the feedback terminal lies in the automatic reply number list is judged; if yes, then step S207 is entered, if not, then this flow ends.

In S207: the initial on-off states of the GPS and weather forecast function are stored.

The GPS and weather forecast function in the local machine may be in the initial on or off state, and the initial state is stored at this moment. If the local machine does not start the GPS function and the weather forecast function, then the GPS function and the weather forecast function are started by force.

In S208: the location data are obtained.

The GPS module is called, and the GPS module receives the GPS satellite signal, and calculates and obtains the current region location information of the local machine according to the satellite signal.

In S209: the weather forecast data are obtained.

The weather forecast module is called, and the weather forecast module converts the obtained region location information into the region marking code, (for example, when it is obtained that the current region location of the local machine is Xi'an City, China, then the location information is converted into the region marking code of Xi'an 086029), and then the weather forecast query code (such as, *#55*086029) is sent to the mobile operation service provider, and the weather information of the region location is obtained.

In S210: whether the weather exceeds the threshold value preset in the step S202 is judged.

The current value of each weather attribute is extracted through the weather information of the region location replied by the mobile operator (for example: Xi'an, 15° C., fine, southeast wind 2 . . . ), and compared with the threshold value preset in the step S202; if the current value exceeds the threshold value, then step S211 is entered, or else, then step S212 is entered.

In S211: the precaution and prompting is sent out to perform warning.

The warning sound is sent out and the precaution and prompting content preset in step S203 is sent out to perform warning, and step S112 is entered.

In S212: the initial state of the GPS and weather forecast function of the local machine is recovered.

Calling the GPS module and the weather forecast module is already finished at this moment, the GPS function and the weather forecast function are recovered as the initial state stored in step S207.

In S213: the location and weather information is sent.

The obtained location and weather information is added to the short message attachment by the figure or text way, and then the short message is sent to the feedback terminal automatically.

Figure 3:
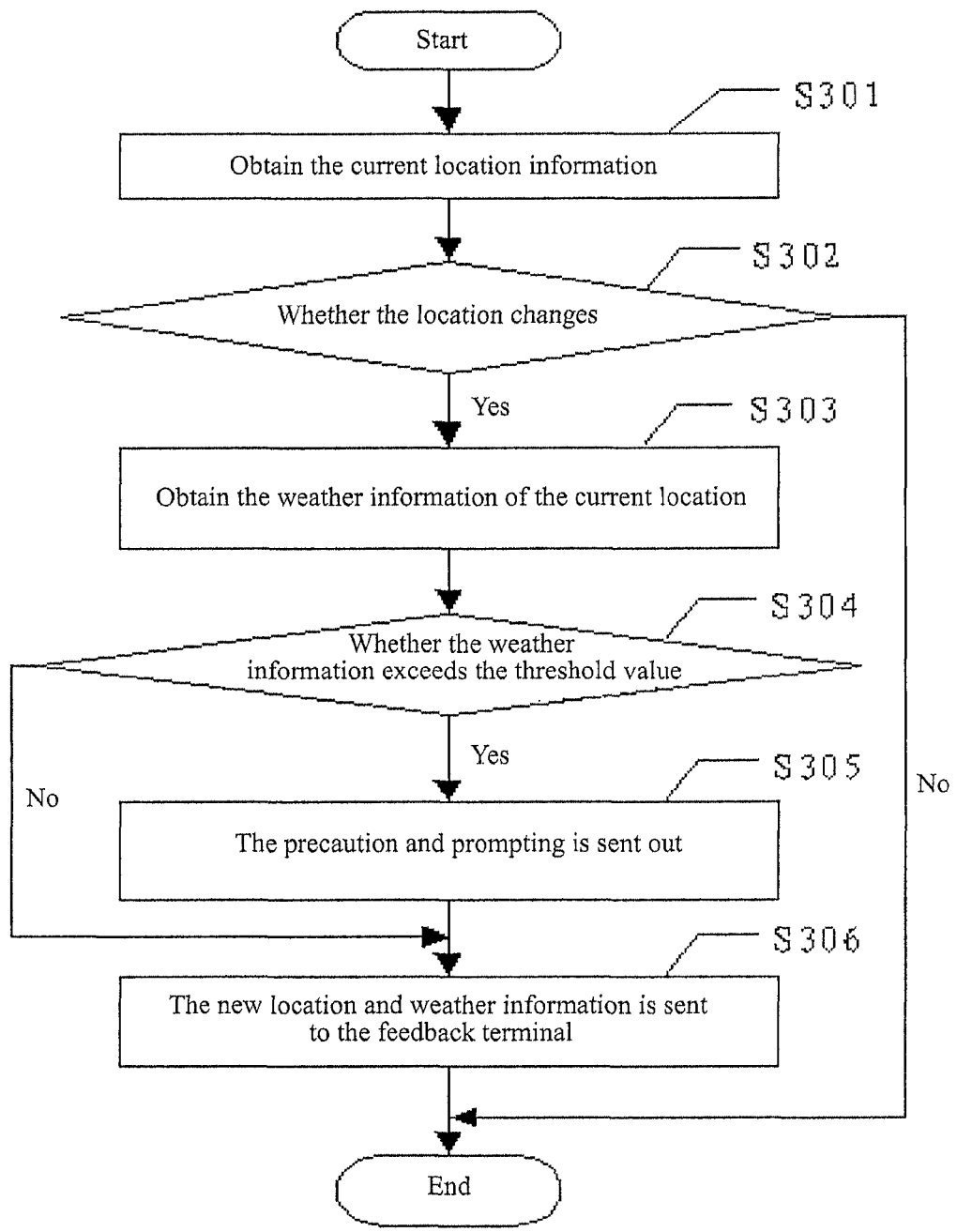
FIG. 3 is a schematic diagram of the flow chart of feeding back location and weather information automatically when the location of the local machine changes according to an embodiment of the present invention.

FIG. 3 is a schematic diagram of the flow chart of feeding back location and weather information automatically when the location of the local machine changes according to an embodiment of the present invention. The GPS module can be started to obtain the location information under timing or other specific conditions, where there is no need to send the feedback request by the feedback terminal at this moment. Whether the location of the local machine changes is judged (for example, it changes from Xi'an into Baoji), and when the location of the local machine changes, the GPS module and the weather forecast module on the terminal can be started, automatically, and the new location data and weather data of the mobile terminal are sent to the appointed mobile terminal voluntarily. The specific steps are as follows:

in S301: the GPS module is called to obtain the current location information.

In S302: whether the location of the local machine changes is checked; if it changes, then step S303 is entered, if it does not change, then this flow ends.

In S303: the weather forecast module of the local machine obtains the weather information of the new location.

In S304: whether the weather information exceeds the preset threshold value. If yes, then step S305 is entered, or else, then step S306 is entered.

In S305: the preset precaution and prompting is sent out. And step S306 is entered.

In S306: the new location and weather information is sent to the preset feedback terminal. The obtained location and weather information is added to the short message attachment by the figure or text way, and then the short message is sent to the feedback terminal automatically.

Figure 4:
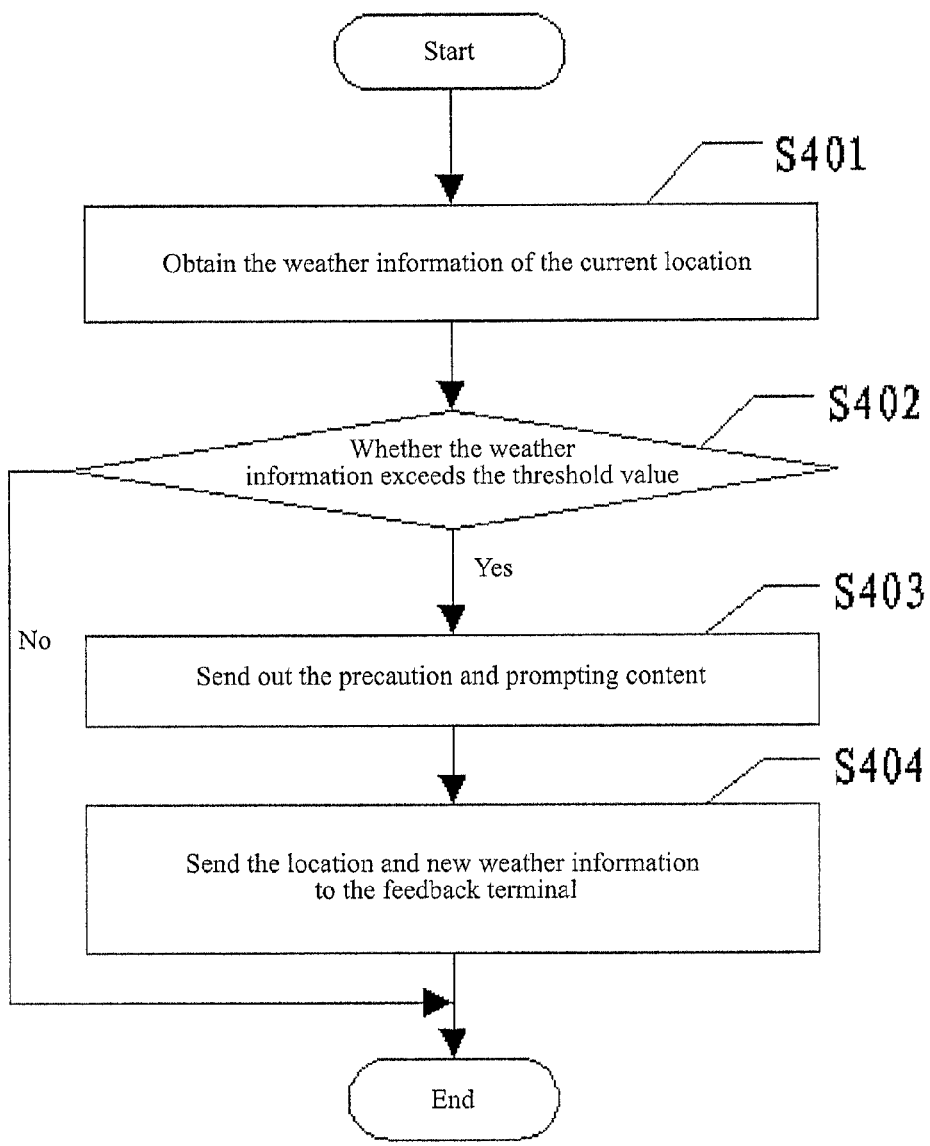
FIG. 4 is a schematic diagram of the flow chart of feeding back location and weather information automatically when the weather of where the local machine locates changes according to an embodiment of the present invention.

FIG. 4 is a schematic diagram of the flow chart of feeding back location and weather information automatically when the weather of the location of the mobile communication terminal changes according to an embodiment of the present invention. The weather forecast module can be started to obtain the weather information under timing or other specific conditions, and there is no need to send the feedback request by the appointed mobile terminal at this moment. When the weather forecast data obtained by the mobile communication terminal exceeds the preset threshold value, the alarm module can make alarm automatically, and the location data and weather data of the mobile terminal are automatically sent to the appointed mobile terminal voluntarily. The specific steps are as follows:

in S401: the weather forecast module is called to obtain the weather information of the current location.

In S402: whether the weather information exceeds the preset threshold value is judged. If yes, then step S403 is entered, or else, then step S404 is entered.

In S403: the warning sound is sent out and the preset precaution and prompting content is sent out. And step S404 is entered.

In S404: the location and new weather information is sent to the feedback terminal.

The obtained location and weather information is added to the short message attachment by the figure or text way, and then the short message is sent to the feedback terminal automatically. The location information can be obtained by directly calling the location information stored in the local machine at the time of the last feedback, and can also obtained by recalling the GPS module to obtain the location information once again to make a confirmation (after sending is finished, the location information can be stored to prepare for being used by the feedback next time), and then the location and new weather information is sent to the feedback terminal automatically.

Figure 5:
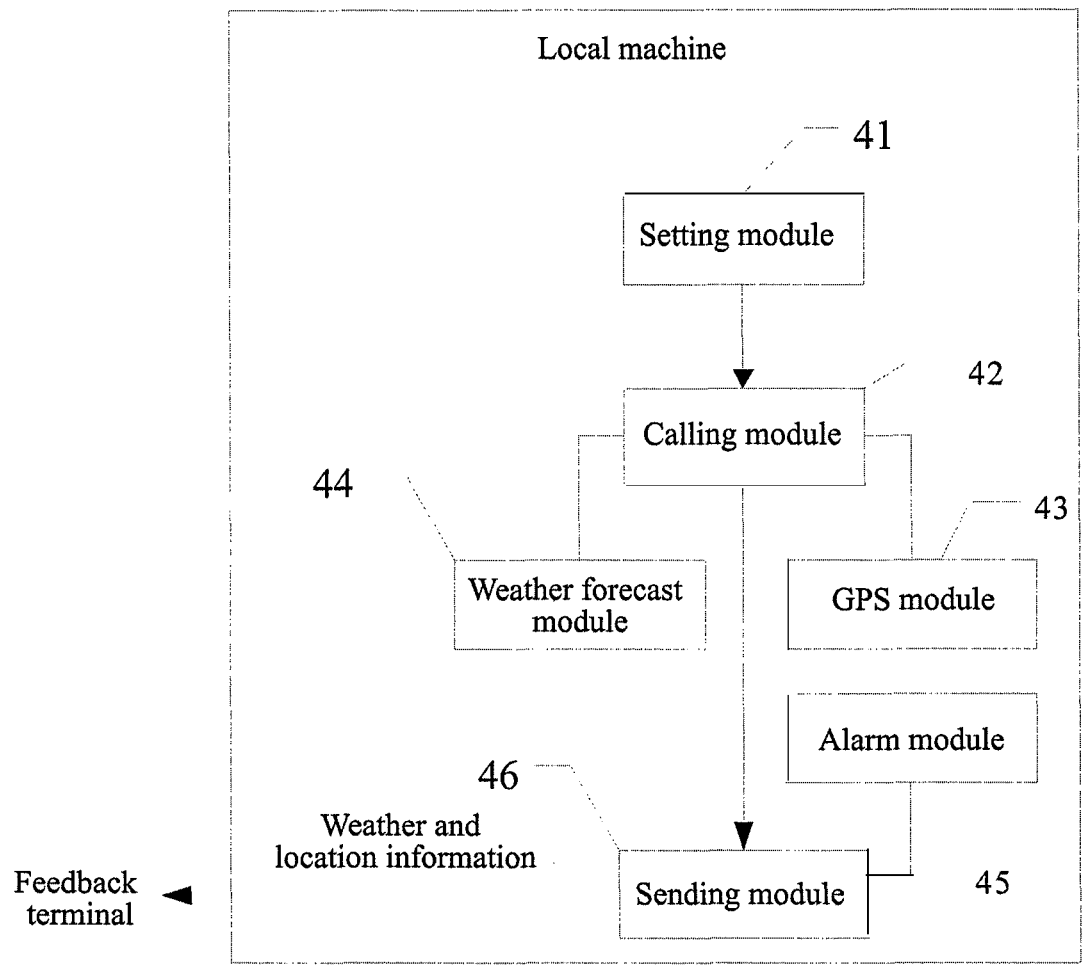
FIG. 5 is a schematic diagram of a mobile communication terminal system according to an embodiment of the present invention.

FIG. 5 is a functional block diagram of a mobile communication terminal provided by an embodiment of the present invention, including a setting module 41, a calling module 42, a GPS module 43, a weather forecast module 44, an alarm module 45 and a sending module 46, wherein, the local machine described in the figure is a mobile communication terminal which is required to feed back the location and weather information, that is, the mobile communication terminal provided by the present invention, and the feedback terminal is a mobile communication terminal of other appointed opposite ends which receives the location and weather information of the local machine. Specifically:

the setting module 41 is configured to set the automatic reply number list of the feedback terminal which requires for feedback of the location and weather information of the local machine terminal.

After starting the local machine, the number which requires for feedback of the location and weather information of the local machine is input in the setting module 41 of the local machine, and the number is the number of the feedback terminal; when the condition is met, the local machine sends the location and weather information to the feedback terminal automatically.

After the automatic reply number list is set completely and stored in the setting module 41, the next step is to set the weather attribute, alarm item and threshold value, wherein, the threshold value can include: one or more kinds of the low temperature threshold value, high temperature threshold value, strong wind threshold value, low visibility threshold value and strong ultraviolet threshold value, as shown in Table 1. When the condition of the alarm item and the threshold value preset in Table 1 is met, and the local machine will automatically alarm and send out prompting. Corresponding to the alarm item in Table 1, the precaution and prompting content in the text or voice format is input in the setting module 41 and stored in the list, as shown in Table 2. When the condition of the alarm item and the threshold value set in Table 1 is met, the local machine sends out the corresponding precaution and prompting in Table 2 automatically.

The calling module 42 is used to call the GPS module 43 and the weather forecast module 44 according to the preset trigger condition and obtain the location information of the terminal and the weather information of the location through the GPS module 43 and the weather forecast module 44.

The preset trigger condition includes that the feedback terminal corresponding to the number in the automatic reply list sends a feedback request, and when the preset trigger condition is met, the GPS module is called, and the GPS module receives the GPS satellite signal and calculates and obtains the current region location information of the local machine according to the satellite signal. The weather forecast module is called and the weather forecast module converts the obtained region location information into the region marking code, (for example, when it is obtained that the current region location of the local machine is Xi'an City, China, then the location information is converted into the region marking code of Xi'an 086029), and then the weather forecast query code (such as, *#55*086029) is sent to the mobile operation service provider, and the weather information of the region location is obtained. When the trigger condition is that the feedback terminal corresponding to the number in the automatic reply list sends a feedback request, the calling module 42 is specifically used to:

acquire the number of the mobile communication terminal of the opposite end which sends the request according to the received feedback request;

traverse the automatic reply number list to determine whether the number is the number of the feedback terminal;

if yes, then the GPS module 43 is called, and the GPS module 43 receives the GPS satellite signal, and calculates its current location information according to the GPS satellite signal;

the weather forecast module 44 is called, and the weather forecast module 44 sends the current location information to the mobile operator, and obtains the weather information of the current location.

As mentioned above, the calling module 42 can judge whether the feedback terminal which sends the feedback request is in the automatic reply number list set by the setting module 41; if yes, then the calling module 42 calls the GPS module 43 and the weather forecast module 44 to obtain the location and weather information.

The GPS module 43 and the weather forecast module 44 in the local machine may be in the initial on or off state, and the calling module 42 stores the initial state at this moment. If the local machine does not start the GPS function and the weather forecast function, then the calling module 42 starts the GPS function and the weather forecast function by force. When calling the GPS module 43 and the weather forecast module 44 is finished, the calling module 42 recovers the GPS module 43 and the weather forecast module 44 as the initial state.

The calling module 42 is not limited to call the GPS module 43 and the weather forecast module 44 when the feedback terminal sends the feedback request instruction as well. The calling module 42 can start the GPS module 43 to obtain the location information under timing or other specific conditions, to judge whether the location of the local machine changes (for example, it changes from Xi'an into Baoji); and if it changes, then the weather forecast module is started automatically to obtain the weather information, and the new location data and weather data are sent to the sending module 46.

The calling module 42 also can start the weather forecast module 44 to obtain the weather information under timing or other specific conditions, to judge whether the weather of the location of the local machine changes; and if it changes, then the location and weather information is sent to the sending module 46 as well.

When the calling module 42 detects that the weather information of the local machine changes, the location information can be obtained by directly calling the location information stored in the local machine at the time of the last feedback, and can also be obtained by recalling the GPS module 43 to obtain the location information once again (after sending is finished, the location information can be stored to prepare for being used by the feedback next time), and then the location and new weather information is sent to the sending module 46.

The GPS module 43 is used to acquire the location information of the local machine, and the GPS module 43 receives the GPS satellite signal and calculates and obtains the current region location information of the local machine according to the satellite signal.

The weather forecast module 44 is used to acquire the weather information. The weather forecast module 44 converts the region location information obtained by the GPS module 43 into the region marking code, (for example, when it is obtained that the current region location of the local machine is Xi'an City, China, then the location information is converted into the region marking code of Xi'an 086029), and then the weather forecast query code (such as, *#55*086029) is sent to the mobile operation service provider to obtain the weather information of the region location.

The alarm module 45 is used to send out the warning sound and/or send out the precaution and prompting content. When the weather information obtained by the calling module 42 exceeds the threshold value preset by the setting module 41, the alarm module 45 can send out the warning sound and send out the precaution and prompting content preset by the setting modules 41 to perform warning automatically; when there is no precaution and prompting content preset in the setting module 41, the alarm module 45 only sends out the warning sound.

The sending module 46 is used to send the obtained location and weather information to the feedback terminal. The sending module 46 adds the obtained location and weather information to the short message attachment by the figure or text way, and then sends the short message to the feedback terminal. When the calling module 42 detects that the weather information of the local machine changes, the location information can be obtained by directly calling the location information stored in the local machine at the time of the last feedback, and can also be obtained by recalling the GPS module 43 to obtain the location information once again to make a confirmation (after sending is finished, the location information can be stored to prepare for being used by the feedback next time), and then the location and new weather information is sent to the feedback terminal.

The above description is only the preferred embodiments of the present invention and is not intended to limit the patent scope of the present invention. All conversions of equivalents structures and equivalents procedures made by using the description and accompanying drawings of the present invention, or direct or indirect application of them in other related technical field, should be included in the protection scope of the present invention.

What is claimed is:

1. A method for feeding back location and weather information by a mobile communication terminal, comprising the following steps of:
    obtaining the location and weather information of a local machine;
    sending the obtained location and weather information to a feedback terminal preset in the local machine and requiring for feedback of the location and weather information of the local machine; and
    both the local machine and the feedback terminal being mobile communication terminals;
    wherein, obtaining the location and weather information of a local machine comprises:
    the local machine, according to a received feedback request, obtaining a number of a mobile communication terminal of an opposite end sending the request;
    judging whether the number is a number of the feedback terminal; if yes, then receiving a Global Positioning System GPS satellite signal, and obtaining the location information of the local machine according to the GPS satellite signal; and
    sending the location information to a mobile operator, and obtaining the weather information of a current location.

2. The method according to claim 1, before the step of receiving a GPS satellite signal and obtaining the location information of the local machine according to the GPS satellite signal, further comprising:
    when the local machine does not start a GPS function and a weather forecast function, then starting the GPS function and the weather forecast function by force.

3. The method according to claim 1, wherein, the step of obtaining the location and weather information of the local machine comprises:
    the local machine checking whether the location information changes;
    if the location information changes, then sending new location information to the mobile operator, and obtaining the weather information of a new location.

4. The method according to claim 1, after performing obtaining the location and weather information of the local machine, further comprising:
    when the obtained weather information exceeds a preset threshold value, then sending out warning information.

5. The method according to claim 4, wherein, the threshold value comprises: one or more of a low temperature threshold value, a high temperature threshold value, a strong wind threshold value, a low visibility threshold value and a strong ultraviolet threshold value.

6. A mobile communication terminal, comprising:
    a setting module, configured to preset a feedback terminal requiring for feedback of location and weather information of the mobile communication terminal;
    a calling module, configured to obtain the location and weather information of the mobile communication terminal; the calling module is configured to: according to a received feedback request, obtain a number of a mobile communication terminal of an opposite end sending the request; judge whether the number is the number of the feedback terminal; if yes, then receive a Global Positioning System GPS satellite signal, and obtain the location information of the mobile communication terminal according to the GPS satellite signal; and send the location information to a mobile operator, and obtain the weather information of a current location; and a sending module, configured to send the obtained location and weather information to the feedback terminal preset by the setting module.

7. The mobile communication terminal according to claim 6, wherein, the calling module is further configured to: when the mobile communication terminal does not start a GPS function and a weather forecast function, start the GPS function and the weather forecast function by force.

8. The mobile communication terminal according to claim 6, wherein, the calling module is configured to:
check whether the location information changes;
if the location information changes, then send new location information to a mobile operator, and obtain the weather information of a new location.

9. The mobile communication terminal according to claim 6, further comprising:

an alarm module, configured to, when the obtained weather information exceeds a preset threshold value, then send out warning information.

10. The mobile communication terminal according to claim 9, wherein, the threshold value comprises: one or more of a low temperature threshold value, a high temperature threshold value, a strong wind threshold value, a low visibility threshold value and a strong ultraviolet threshold value.

11. The method according to claim 1, after performing obtaining the location and weather information of the local machine, further comprising:
when the obtained weather information exceeds a preset threshold value, then sending out warning information.

12. The mobile communication terminal according to claim 6, further comprising:
an alarm module, configured to, when the obtained weather information exceeds a preset threshold value, then send out warning information.

* * * * *